April 24, 1934. A. B. MOJONNIER 1,956,077
LIQUID LEVEL CONTROL MECHANISM
Filed Aug. 17, 1932 3 Sheets-Sheet 1
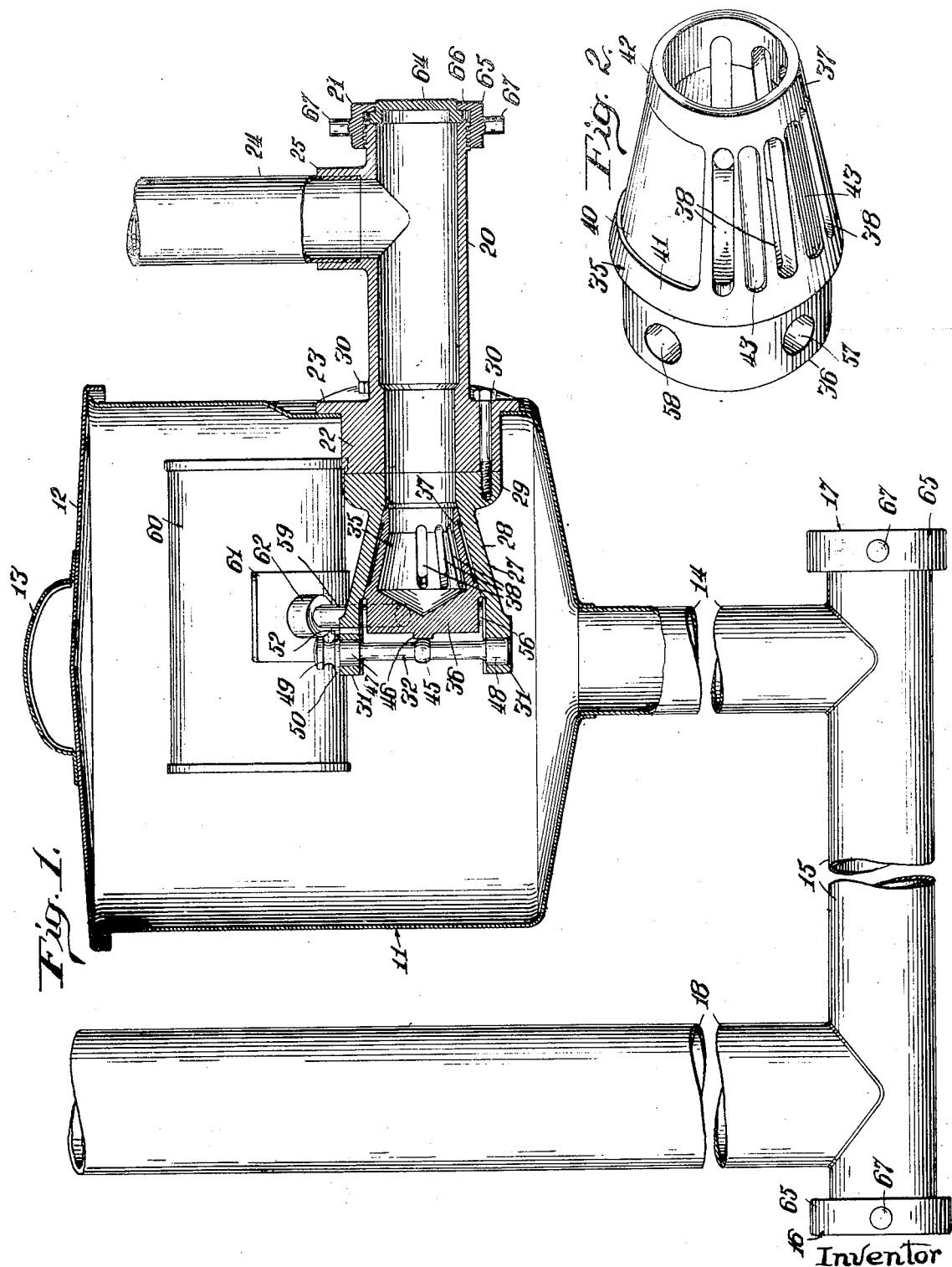
Inventor
Albert B. Mojonnier
By Thomas H. Ferguson
Attorney.

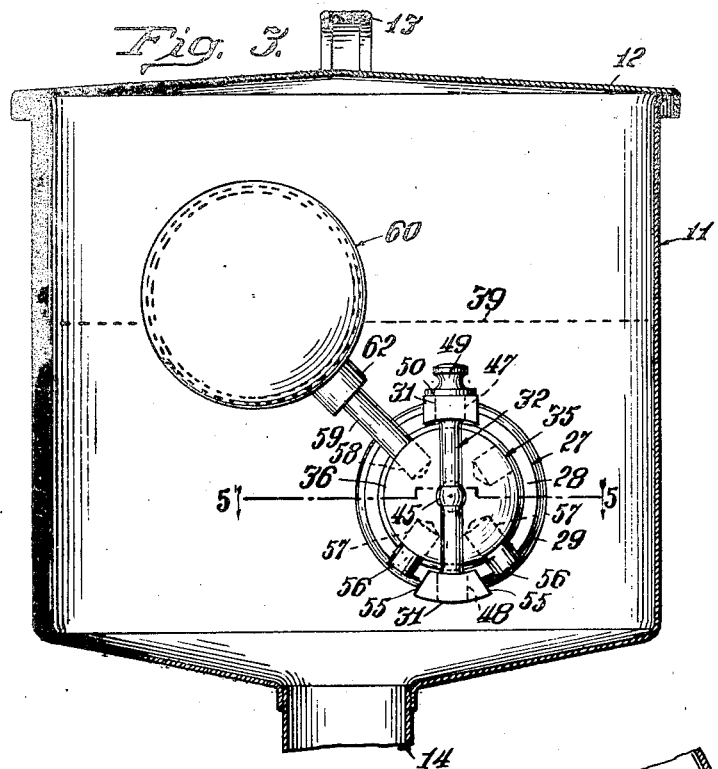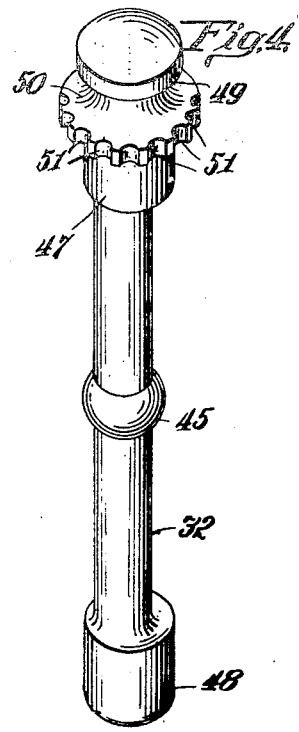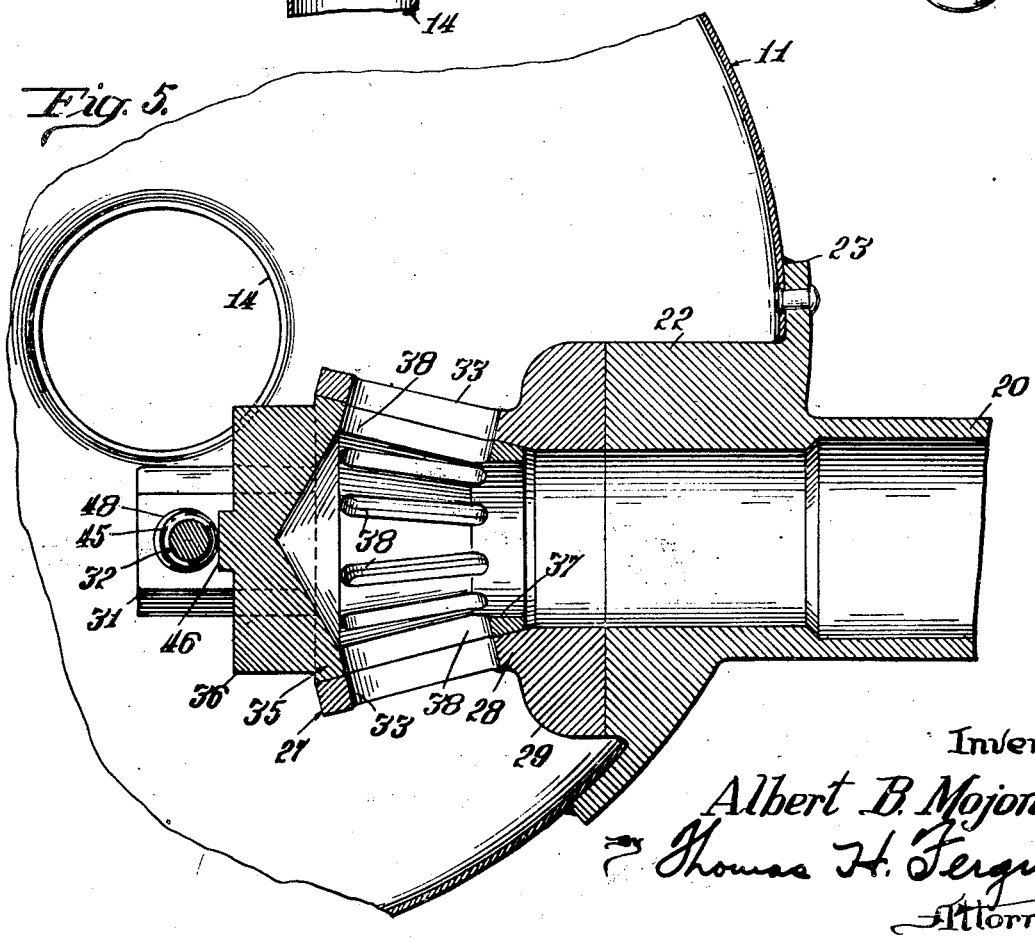

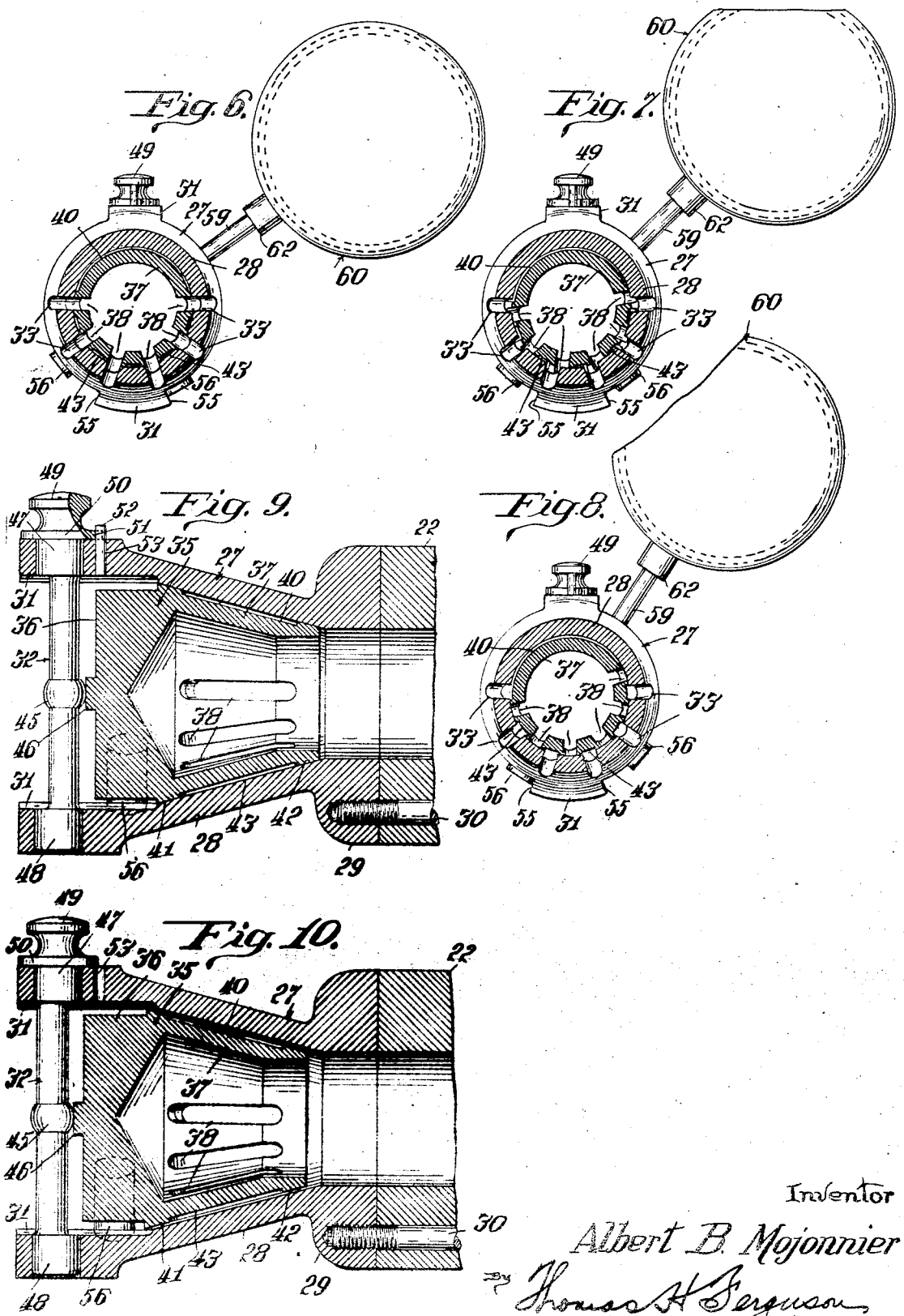

Patented Apr. 24, 1934

1,956,077

UNITED STATES PATENT OFFICE 1,956,077

LIQUID LEVEL CONTROL MECHANISM

Albert B. Mojonnier, River Forest, Ill., assignor to Mojonnier Bros. Co., a corporation of Illinois Application August 17, 1932, Serial No. 629,168

3 Claims. (Cl. 251—95)

The present invention relates to liquid level control mechanisms, and has to do more particularly with the production of a mechanism of this class for the handling of more or less viscous or sticky liquids.

The invention has been worked out for, and embodied in, mechanism of the class mentioned, intended for the handling of milk and cream and maintaining proper levels thereof in bottle filling machinery. The embodiment thus produced will, therefore, be described and illustrated herein.

The conditions encountered in the handling of liquids of the class mentioned are quite different from those which are encountered where the liquids are thinner and more fluent.

The principal object of the present invention is to provide a level maintaining mechanism, and particularly a suitable valve, which will operate with extreme nicety in the maintaining of proper levels of milk, cream, or other like viscous liquids.

In attaining this end, I provide a mechanism wherein a valve of the plug type is used, and I arrange the latter with suitable valve casing (or seat) openings through which the liquid passes, and provide for adjustment of the plug element in the direction of its axis of rotation, in order that the same may be more or less tightly fitted against the casing or seat, according to the requirements of the particular liquid being passed. In addition to this longitudinal adjustment of the plug element, I also considerably reduce the area of ultimate contact between the valve and casing surfaces. This, in the embodiment disclosed, is of especial value in freeing the parts for ready rotation of the plug member. This small area of ultimate contact is preferably provided by cutting away, or routing out, portions of the original contacting surfaces, so as to leave shallow depressions. Preferably, these depressions are made in the plug member although obviously, in some instances, it might be desirable to rout out portions of the casing or seat member. The latter, however, is not preferred and is therefore not illustrated. In the operations of the valve, a refined adjustment of the routed out plug member along its axis of rotation enables it to be nicely set with reference to the cooperating casing or seat surface. Ordinarily, a float member is connected to a stem which is attached to the valve and rotates the latter to vary the size of the opening through which the liquid passes. The longitudinal adjustment of the valve member gives the necessary freedom of rotation for the particular liquid being handled.

These and other features and advantages of the invention will be more fully understood upon reference to the following description taken in connection with the accompanying drawings, while the scope of the invention will be particularly pointed out in the appended claims.

In said drawings, Fig. 1 is a sectional elevation of a control mechanism constructed and arranged in accordance with the present invention, the plane of section being vertical and central through the axis of the tubular inlet member and the associated valve; Fig. 2 is a perspective view of the hollow plug valve which is rotatable in the valve casing to vary the feed of liquid and thus maintain the proper level in the associated container; Fig. 3 is an end elevation of the parts located in the container, the container itself being shown in transverse section, the parts being viewed from the left as they appear in Fig. 1; Fig. 4 is a perspective view of the adjusting pin by which the plug member is limited in its outward movement away from its seat; Fig. 5 is a horizontal sectional view of a portion of the mechanism, the plane of section being horizontal and through the axis of rotation of the valve, as indicated by the line 5—5 of Fig. 3; Figs. 6, 7 and 8 are like sectional elevations, showing the valve in transverse section and the float in elevation, the same occupying different operating positions, corresponding, in Fig. 6, to the full open position of the valve, in Fig. 7, to the partially closed position of the valve, and in Fig. 8, to the fully closed position of the valve; and Figs. 9 and 10 are like longitudinal vertical sections through the valve illustrating the plug member in different adjustments with reference to the casing, said member being, in Fig. 9, in close relation to the casing, and in Fig. 10, somewhat removed therefrom so as to be more readily rotatable therein, these adjustments indicating the way in which the valve is to be used with liquids of different viscosities. Throughout these views like characters refer to like parts.

Referring to said drawings in detail, 11 indicates the body of the container which is preferably circular in horizontal outline and has a height substantially equal to its diameter. The casing 11 is provided with a cover 12 having a suitable handle 13 on its upper side. In this instance, the outlet to the container is provided in the bottom through a pipe or tube 14 which is secured at its upper end, preferably by welding, to a central opening in the bottom of the container. In the embodiment illustrated, the lower end of the tube 14 is connected to a horizontal tube 15 which is provided at its ends with removable closures 16, 17. The end of the tube 15 adjacent to the closure 17 is connected to an upright tube or pipe 18 which rises to a height above that which is normally maintained by the liquid in the container 11. The pipes 14, 15 and 18 are suitably joined together preferably by welding. Where the mechanism is employed in conjunction with a filling machine, the pipe 18 may be the liquid supply pipe of that machine.

The inlet for the supply of liquid to the container 11 includes a tubular member 20 which is preferably straight and enters the container through an opening provided at one point in its circular wall. The outer end of the member 20 is provided with a closure 21 similar to the closures 16, 17. At its inner end it is considerably enlarged to provide a base 22 from which extends a peripheral flange 23, by means of which it is secured to the wall of the container, preferably by riveting and soldering. The inlet member 20 is also preferably straight and is connected near its outer end with a vertical supply pipe 24. In this instance a tubular portion 25 extending upward from the member 20 is bored out or provided with a portion of slightly larger interior diameter for the reception of the lower end of the pipe 24, and thus a smooth interior is provided at the connecting point.

Within the container 11, and secured to the inner end of the inlet member 20, is the valve casing 27. This casing has a truncated conical wall 28 which ends in an enlarged base 29 which fits against the base 22 forming the inner end of the inlet member 20. The valve casing 27 is firmly secured in place upon the inlet member 20 preferably by machine bolts 30 which pass through openings in the base 22 and enter threaded openings in the base 29 of the valve casing. As clearly shown, the wall 28 of the valve member 27 converges outwardly. It also carries at its inner end a pair of bearing arms 31 for the reception of the adjusting pin 32. These arms extend beyond the inner end of the valve casing and are preferably diametrically opposite each other. In the embodiment illustrated, the lower side of the conical wall 28 has in it a series of longitudinal slots 33. These are preferably located in the lower half of the wall and in the embodiment shown are six in number.

The movable element of the valve structure is the hollow plug valve 35. It has a closed end which forms a head 36. Extending from the head 36 is a skirt or wall 37 which is conical and converges outwardly from the head. The inclination of the conical wall 37 of the plug member 35 is the same as the inclination of the conical wall 28 of the valve casing 27. Because of this identity of inclination, the plug member will fit snugly within the casing member and when in proper position will completely cut off any flow of liquid from the inlet member 20 into the container 11. Just as the lower portion of the casing 28 has a series of slots 33, so the lower portion of the wall 37 has a like number of longitudinal slots 38 which cooperate with the slots 33, the number and circumferential arrangement of the two sets agreeing, as clearly shown in Figs. 6, 7 and 8.

The cooperating valve and casing walls fit together with varying degrees of tightness, depending on the relative longitudinal positions of the valve and its casing. This is clearly shown in Figs. 9 and 10. In the former of these, the plug member 35 is shown in close contact with the valve member 28, while in the latter of these, the plug member 35 is positioned in the casing 28 somewhat more loosely. It will be apparent that this longitudinal adjustment of the plug member will have much to do with the freedom of its rotation. The tighter the fit, the more difficult the rotation. It is found when using the mechanism disclosed, that the plug valve 35 must be differently adjusted in longitudinal position when handling cream and milk. These two liquids are quite different in viscosity and other characteristics. Consequently, the adjustment of the valve has to be more open or free in order to care for cream than it does when handling milk.

It should also be noted in this connection that the discharge of the liquid through the slots 33, 38 into the container is such as to prevent the incorporation of air in the liquid in the container. This is important where milk or cream are being handled on the way to a vacuum filling machine of the kind in conjunction with which this mechanism was developed, the same being a machine designed on the lines of that of Broadhurst's United States Patent No. 1,665,948, dated April 10, 1928. The incorporation of air in milk and cream produces foaming which is very objectionable when feeding machines of the Broadhurst type. As will be observed, the valve slots 33, 38 are on the lower side of the valve parts and the entire valve is below the normal milk level, indicated at 39 in Fig. 3. This arrangement contributes to a minimizing of the incorporation of air in the liquid.

Not only is the longitudinal position of the plug member 35 important, but it is also very desirable in order to obtain satisfactory results in the handling of milk and cream, to reduce the ultimate area of contact between the outer conical face of the plug member 35 and the inner conical face of the casing member 28. In this way the portions of the conical surfaces which come into more immediate contact are considerably reduced. In the preferred construction, this change in contact area is brought about by cutting away or routing out the upper surface of the plug member 35 between the uppermost slots 38 to produce a lower surface 40 bounded at its ends by the higher surfaces 41, 42. Thus, there is produced on the upper side of the plug member a large depression which runs the full length of the slots, the portions 41, 42 being portions of the conical surface originally formed. In addition to the large depression on the upper side of the plug member 35, the spaces between the slots 38 are grooved or routed out in order to provide depressed surfaces 43 which preferably have the same degree of depression as the surfaces 40. The depressions between the slots 38 extend the same length as the larger depression and consequently the same length as the slots. It will be noted that the more elevated portions 41, 42 of the outer conical surface of the plug member constitute the main bearing surfaces of said member against the interior conical surface of the casing member 28. The provision of these depressions upon the surface of the valve member greatly assists in the movement of the plug member with highly viscous liquids.

As before noted, the same has been found very desirable where the mechanism has been employed in the maintaining of cream and milk levels. The advantages of the cut away surfaces in the handling of milk or cream seems to be due to the fact that the milk and cream deposit butter fat on the surface of the valve and this fat is moved back and forth by the oscillations of the valve and were the surfaces not cut away the valve would be clogged and its free operation greatly hindered; but by cutting away the greater portion of the one surface upon the cone of contact, the particular butter fat which is thus rolled up remains in the depressions without interfering in any way with the free movements of the valve as the same is operated to admit milk or cream into the tank.

In order to properly set the plug member 35 along its axis of rotation, it is necessary to provide an adjustable stop which will limit the movement of the plug out of the casing. Normally the incoming liquid will force the valve member 35 against any stop thus provided. For this reason, it is not necessary to have means for drawing the plug valve away from the casing member. Different means may be employed for providing the stop adjustment, but I preferably employ the transverse pin 32 previously mentioned and provide at its center a bulbous bearing 45 which takes the form of a projection or elevation which completely surrounds that portion of the pin. The projection 45 is in line with the axis of rotation of the valve 35, and preferably I provide a bearing nub 46 on the head 36 of the valve member. It will be seen that when the projections 45 and 46 are in engagement with each other, their point of contact is in line with the axis of rotation of the valve. Consequently the valve will rotate freely, these parts serving as a sort of thrust bearing, and journal.

In order to shift the valve member 35 longitudinally, I preferably mount the central portion of the pin 32 eccentrically of its axis of rotation. In other words, the central portion of the pin 32 between the journals 47, 48, is eccentric relative to the axis of those journals. The journals 47, 48 upon the pin 32 are mounted in aligned openings which constitute bearings for the pin. One end of the pin is provided with a head 49 by which the pin may be readily rotated by hand. In order to set the pin in different positions of adjustment, it is provided with a notched flange or segment 50, the notches 51 being provided in the periphery of the flange. In order to hold the adjusting pin 32 in set position, a small set pin 52 is used. This pin 52 is thrust into and soldered or otherwise firmly held in an opening 53 formed in one of the bearing arms 31. By positioning a notch 51 in alignment with the pin 52, while holding the flange 50 above the upper end of the pin 52, the adjusting pin 32 may be readily put back in place in its bearings and thus be held against rotation in proper adjusted position.

It will be apparent, from what has been said, that it is only necessary to rotate the valve member 35 through a relatively small angle in order to bring about the extreme and intermediate positional relations illustrated in Figs. 6, 7 and 8. Accordingly, the casing member 28 is provided with a projection 55 which has radial shoulders at its ends which serve as stops for a pair of stop pins 56, which are inserted in corresponding radial openings 57 provided in the head 36 of the valve 35. The pins 56 engage the opposite ends of the projection 55, and thus the extent of rotation of the valve member 35 is limited. The head 36 also contains similar radial openings 58 located in the upper portion of the head 36 but at an angle from the vertical. These openings are provided for the insertion of a stem 59. As the parts appear in Fig. 3, the stem 59 is inserted in the left hand opening 58. The outer end of the stem 59 carries the float member 60. The latter may be variously constructed. In the present instance, it is a hollow cylindrical tank hermetically sealed and having a reinforcing center plate 61 provided with a boss 62 which is bored out to receive the outer end of the stem 59. In some installations the valve inlet 20 enters the opposite side of the container 11 from that shown in the present illustrations, and in such case the other opening 58 is used for the reception of the stem 59 and its float member 60. In other words, the two radial openings 58 provide for either a right hand arrangement or a left hand arrangement of the equipment, depending upon the way in which the original installation with which the mechanism is to be used is laid out.

It will be apparent from an inspection of the drawings that the various parts are arranged for ready cleaning. As previously pointed out, the inlet member 20 is rectilinear and when the closure 21 is removed, the interior of the member 20 may be easily cleaned. It is also possible to easily remove the plug valve member 35 from its casing 27 by simply removing the adjusting pin 32. The interior of the casing 27 may then be thoroughly cleaned by a swab or brush inserted at the open end of the inlet member 20, since all the openings are in alignment there are no dead ends in the pipe. The removed plug 35 and the associated pin 32 may be readily removed from the container and cleaned. The vertical pipe 14 being to one side of the valve, as clearly shown in Fig. 5, may be readily cleaned also by a straight swab or brush. By removing the closures 16 and 17, the pipe 15 may be cleaned. Similarly, the pipe 18 may be cleaned from the top. Thus, all parts of the equipment may be readily taken apart for cleaning and then as readily replaced. In case it becomes necessary because of wear or breakage to remove the valve casing 27, then all that is necessary is to remove the screws 30, of which these are usually three or four, and withdraw the entire valve from the container.

The closures 16, 17 and 21 may be made in various ways. In the present instance a cap 64 is fitted against the end of the associated pipe and then a securing ring 65 provided with an interior thread is screwed on to the threaded end of the associated tubular member. A flange 66 on the ring 65 engages outer faces on the cap 64 and presses the latter into close engagement with the end of the associated tubular member. The coupling ring 65 has studs 67 projecting from its periphery for the ready attachment of a spanner wrench, or other means, for tightening up the parts.

Obviously, the material out of which the various parts of the mechanism are made is metal. Commonly where milk and cream are to be handled, the tubes and parts made of sheet stock are composed of stainless steel and the castings are made of nickel alloy, these materials being quite extensively employed in other branches of the same industry.

In carrying out my invention, it will be apparent that the embodiment disclosed may be modified in several details without departing from the spirit and scope of the invention. I therefore aim to cover by the terms of the appended claims all those alterations and modifications which rightly come within its spirit and scope.

I claim:

1. In a liquid level control mechanism, a valve casing having a truncated conical wall defining a truncated conical bore, said bore being completely open at its base and top for cleaning purposes, a pair of bearing arms projecting beyond said casing from opposite sides of its larger end, said arms being continuations of said conical wall, said conical wall having therein a series of longitudinal slots, a readily removable rotatable hollow plug valve having a head and a conical wall converging therefrom and fitted within said casing, the end of said plug distant from its head being entirely open to give access to its interior for cleaning, the conical wall of said plug valve having a series of longitudinal slots adapted to cooperate with the slots in said casing to allow the passage of liquid therethrough, the cooperating valve and casing walls fitting together with varying degrees of tightness depending upon the relative longitudinal positions of the same, the outer surface of the conical wall of said valve having depressions between its slots, the portions of said outer conical surface at the ends of said depressions constituting the main bearing surfaces of said valve against the interior conical surface of said casing, a bearing nub on the head of said plug valve in line with its axis of rotation, a readily removable transverse adjusting pin having journals at its ends positioned in bearings in said bearing arms, the central portion of said pin between said journals being eccentric relative to the axis of rotation of said pin, and a bulbous bearing at the center of said pin cooperating with said bearing nub both in the longitudinal adjustment of said valve in said casing in response to the rotation of said adjusting pin and in the rotary oscillations of said valve within said valve casing.

2. In a liquid level control mechanism, a valve casing open at both ends and having a truncated conical wall, said wall having therein a series of openings, the open ends providing access to the interior of the casing for cleaning purposes, a removable hollow plug valve having a closed end forming a head and a conical wall forming sides of an open mouthed cup, the cup walls being adapted to fit into said casing against the conical wall of the latter, the conical wall of said plug valve having a series of openings for cooperation with the openings in said casing to regulate the passage of liquid therethrough, the cooperating conical walls fitting together with varying degrees of tightness depending upon the relative longitudinal positions of the same, a pair of bearing arms projecting from said casing beyond said valve head, a transverse adjusting pin removably mounted in said arms and having a central bearing positioned to engage the axial center of said valve head, means whereby the rotation of said pin shifts the position of said central bearing to alter the limit of movement of said valve outward of said casing, and means for rotating said valve relative to said casing.

3. In a liquid level control mechanism, a valve casing having a truncated conical wall converging towards its inlet end and being open at said end for ready cleansing, a pair of bearing arms extending from opposite sides of the wide end of said valve casing beyond the same, one side of the conical wall of said valve casing having therein a series of longitudinal slots, a readily removable rotatable hollow plug valve having a head and a converging conical wall fitted within said valve casing, a part of the conical wall of said valve having a series of longitudinal slots therein adapted to cooperate with the slots in said valve casing to allow the passage of liquid through said valve and casing, the cooperating conical valve and casing walls fitting together with varying degrees of tightness depending upon the relative longitudinal positions of the same, the outer surface of the conical surface of said valve having a large depression on the one side and narrow flute-like depressions on the other side between the slots therein, the portions of said outer conical surface at the ends of said depressions constituting the main bearing surfaces of said valve against the interior conical surface of said casing, said plug valve having a bearing in line with its axis of rotation, a readily removable adjusting pin extending transversely of said axis of rotation and having journals at its ends positioned in bearings in said bearing arms, the central portion of said pin between said journals being eccentric relative to the axis of rotation of said pin and providing an intermediate bearing cooperating with said plug valve bearing both in the longitudinal adjustment of said valve in said casing in response to the rotation of said adjusting pin and in the rotary oscillations of said valve within said valve casing.

ALBERT B. MOJONNIER.